US010774615B2

(12) United States Patent
Froehling

(10) Patent No.: US 10,774,615 B2
(45) Date of Patent: Sep. 15, 2020

(54) MULTI-PORT BALL VALVE FOR WHILE DRILLING APPLICATIONS

(71) Applicant: BAKER HUGHES INCORPORATED, Houston, TX (US)

(72) Inventor: Joern Froehling, Meinersen (DE)

(73) Assignee: BAKER HUGHES HOLDINGS LLC, Houston, TX (US)

(*) Notice: Subject to any disclaimer, the term of this patent is extended or adjusted under 35 U.S.C. 154(b) by 121 days.

(21) Appl. No.: 15/251,157

(22) Filed: Aug. 30, 2016

(65) Prior Publication Data

US 2018/0058176 A1  Mar. 1, 2018

(51) Int. Cl.
*E21B 34/06* (2006.01)
*F16K 11/087* (2006.01)

(52) U.S. Cl.
CPC ............ *E21B 34/066* (2013.01); *E21B 34/06* (2013.01); *F16K 11/0873* (2013.01); *F16K 11/0876* (2013.01); *E21B 2200/04* (2020.05)

(58) Field of Classification Search
CPC ...... E21B 21/10; E21B 21/103; E21B 34/066; E21B 34/10; E21B 34/06; E21B 34/16; E21B 47/00; E21B 47/01; E21B 47/06; E21B 43/14; E21B 49/087; E21B 2034/002; E21B 41/00; E21B 17/028; E21B 33/127; E21B 33/10; E21B 23/03; E21B 23/00; E21B 47/006; E21B 47/013; E21B 2200/04; E21B 49/0875; E21B 41/0099; E21B 17/0283; E21B 17/0285; E21B 23/12; F16K 5/0605; F16K 11/0873; F16K 11/0876; F16K 15/18–188
See application file for complete search history.

(56) References Cited

U.S. PATENT DOCUMENTS

| 3,217,731 A | 11/1965 | Swanson |
| 3,480,040 A | 11/1969 | Howard |
| 4,372,391 A | 2/1983 | Barrington et al. |
| 4,476,933 A | 10/1984 | Brooks |
| 4,714,092 A | 12/1987 | Sanders |
| 4,894,988 A | 1/1990 | Hoppenjans |

(Continued)

FOREIGN PATENT DOCUMENTS

WO  WO0106157 A1  1/2001

OTHER PUBLICATIONS

EPO Application No. 17188656.7—EP Search Report dated Jan. 25, 2018.

*Primary Examiner* — George S Gray
(74) *Attorney, Agent, or Firm* — Mossman Kumar & Tyler PC

(57) ABSTRACT

An apparatus for controlling fluid flow in a wellbore may include a valve disposed along a drill string. The valve includes a valve body having an internal chamber, a plurality of ports formed in the valve body, a ball disposed in the internal chamber, and an actuator operatively connected to the ball. The ball includes at least one flow bore. The actuator shifts the ball into at least a first position wherein the flow bore is in fluid communication with at least two of the plurality of ports, and a second position wherein the flow bore is isolated from at least one of the plurality of ports. A related method includes conveying a drill string having the above-described valve along the wellbore and controlling a flow of fluid by shifting the ball using the actuator.

16 Claims, 13 Drawing Sheets

(56) References Cited

U.S. PATENT DOCUMENTS

| | | | |
|---|---|---|---|
| 5,050,681 A | 9/1991 | Skinner | |
| 5,156,207 A | 10/1992 | Haugen et al. | |
| 5,551,467 A | 9/1996 | Booth et al. | |
| 7,213,612 B2 | 5/2007 | Weiler et al. | |
| 7,320,457 B2 | 1/2008 | Heim et al. | |
| 8,100,199 B2 | 1/2012 | Braddick | |
| 9,045,962 B2 | 6/2015 | Christie et al. | |
| 2004/0060703 A1* | 4/2004 | Stegemeier | E21B 17/003 166/310 |
| 2008/0315144 A1* | 12/2008 | Thomas | F16K 5/201 251/315.1 |
| 2009/0242817 A1 | 10/2009 | Strazhgorodskiy | |
| 2013/0269951 A1* | 10/2013 | Tahoun | E21B 34/06 166/373 |
| 2016/0222743 A1 | 8/2016 | Gosney | |
| 2016/0298439 A1* | 10/2016 | Morrow | E21B 34/06 |

\* cited by examiner

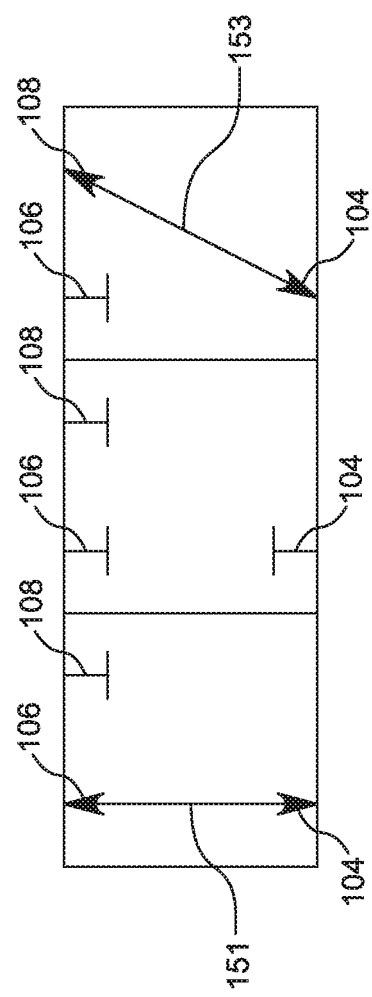

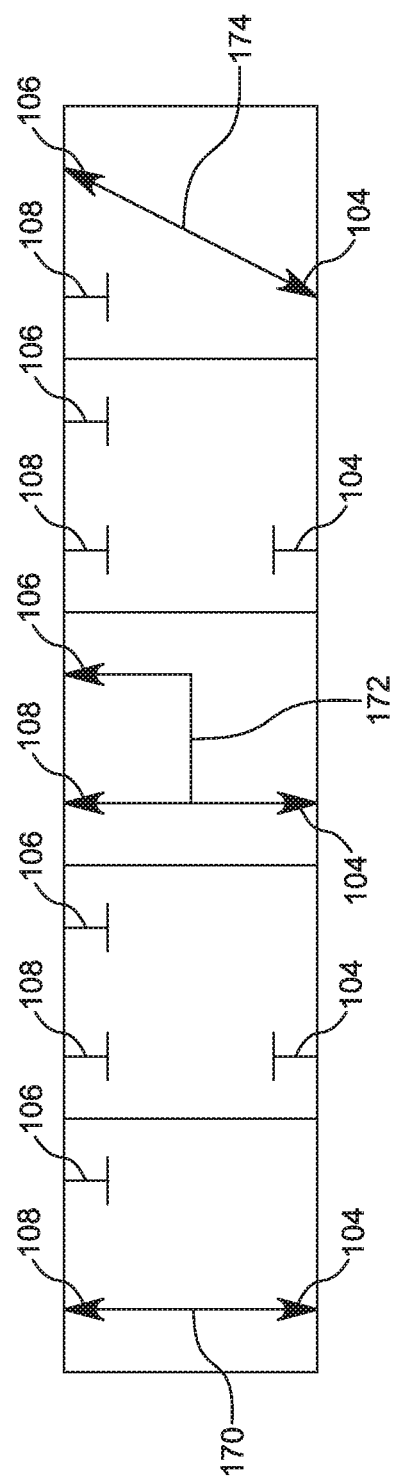

MULTI-PORT BALL VALVE FOR WHILE DRILLING APPLICATIONS

BACKGROUND OF THE DISCLOSURE

1. Field of the Disclosure

This disclosure relates generally to oilfield downhole tools and more particularly to methods and devices for selectively controlling flow between two or more downhole locations.

2. Description of the Related Art

To obtain hydrocarbons such as oil and gas, boreholes or wellbores are drilled by rotating a drill bit attached to the bottom of a BHA (also referred to herein as a "Bottom Hole Assembly" or ("BHA"). The BHA is attached to the bottom of a tubing, which is usually either a jointed rigid pipe or a relatively flexible spoolable tubing commonly referred to in the art as "coiled tubing." The string comprising the tubing and the BHA is usually referred to as the "drill string." The BHA may include numerous tools and instruments for controlling drilling operations. Some of these tools and instruments may require that fluids be conveyed between two or more locations. Illustrative fluids include liquids and gases such as formation fluids, drilling fluids, lost circulation material, air, nitrogen, water, brine, hydraulic fluids, cement, gravel, acids, etc.

The present disclosure addresses the need to efficiently and reliably convey these fluids between two or more downhole locations.

SUMMARY OF THE DISCLOSURE

In aspects, the present disclosure provides an apparatus for controlling fluid flow in a wellbore. The apparatus may include a drill string configured to drill the wellbore and a valve. The valve may be disposed along the drill string and include a valve body having an internal chamber, a plurality of ports formed in the valve body, a ball disposed in the internal chamber, the ball including at least one flow bore, and an actuator operatively connected to the ball. The actuator shifts the ball into at least a first position wherein the flow bore is in fluid communication with at least two of the plurality of ports, and a second position wherein the flow bore is isolated from at least one of the plurality of ports. In aspects, a related method for controlling fluid flow in a wellbore includes conveying a drill string having the above-described valve along the wellbore and controlling a flow of fluid by shifting the ball using the actuator.

Illustrative examples of some features of the disclosure thus have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein:

FIGS. 3D-F illustrate flow conditions associated with the FIGS. 3D-F valve operating states, respectively;

FIGS. 5A-E illustrate another valve configuration in accordance with embodiments of the present disclosure; and.

FIGS. 6A-E illustrate flow conditions associated with the FIGS. 5A-E valve configuration, respectively.

DETAILED DESCRIPTION OF THE DISCLOSURE

Figure 1:
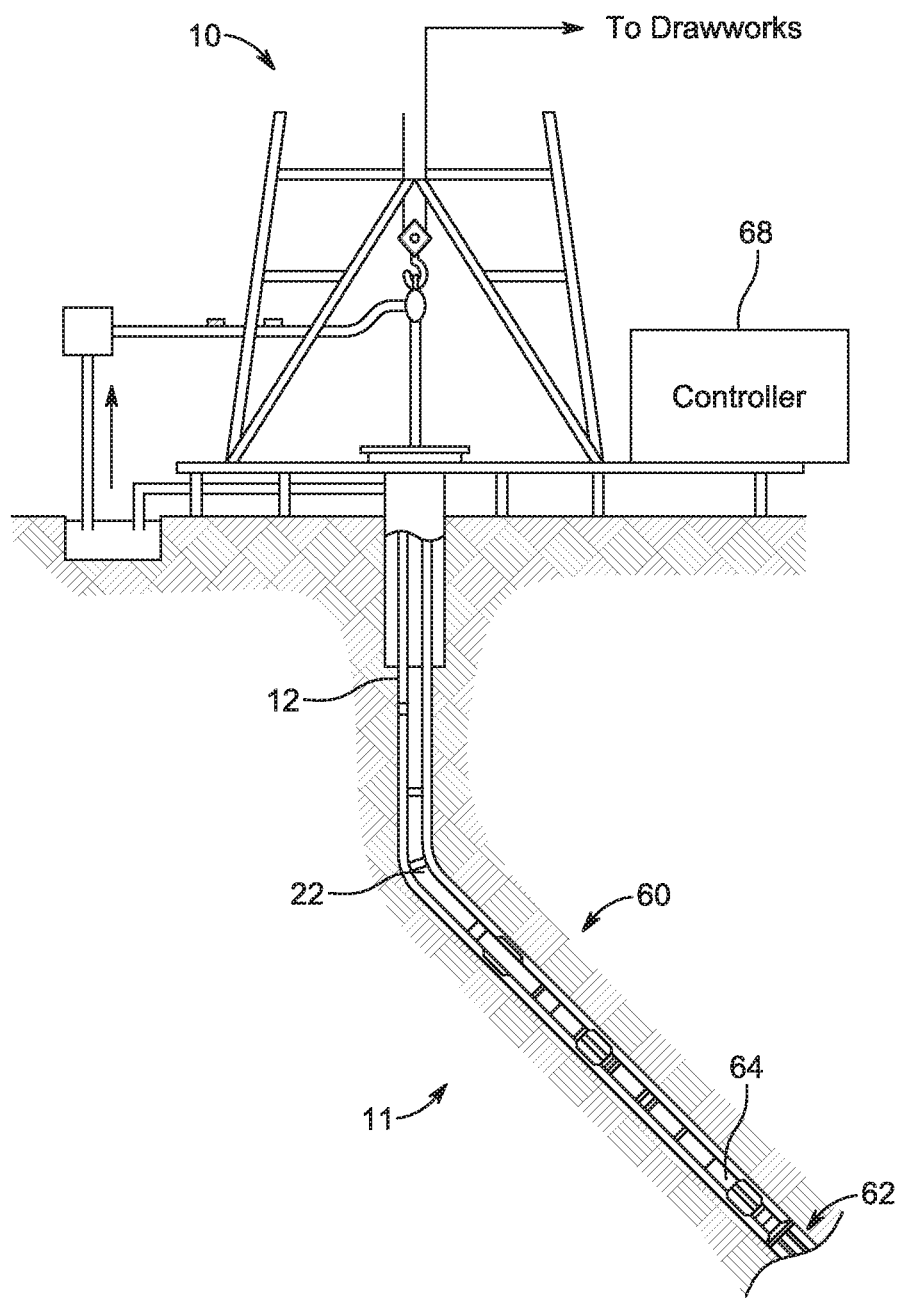
FIG. 1 shows a schematic diagram of a well construction system with a bottomhole assembly utilizing a valve of the present disclosure.

The present invention relates to an apparatus and methods for conveying fluids between two or more downhole locations. The fluids may be liquids, gases, mixture of liquids and/or gases, and may include entrained solid particles. The downhole locations may be inside a drill string or BHA, an annulus around the drill string, and/or within a surrounding formation. Illustrative valves according to the present disclosure may be used with a variety of downhole tools, including, but not limited to, downhole packers, fluid sampling tools, coring tools, circulation subs, steering assemblies, adjustable centralizers, drilling motors, thrusters, etc. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In FIG. 1, there is shown an embodiment of a drilling system 10 utilizing a bottomhole assembly (BHA) 60 configured for drilling wellbores. While a land system is shown, the teachings of the present disclosure may also be utilized in offshore or subsea applications. In FIG. 1, a laminated earth formation 11 is intersected by a wellbore 12. The BHA 60 is conveyed via a drill string 22 into the wellbore 12. The drill string 22 may be jointed drill pipe or coiled tubing, which may include embedded conductors for power and/or data for providing signal and/or power communication between the surface and downhole equipment. The BHA 60 may include a drill bit 62 for forming the wellbore 12. In some embodiments, the BHA 60 may include one or more rotary power sources such as a drilling motor 120. Other tools and devices that may be included in the BHA 60 include steering units, MWD/LWD tools that evaluation a borehole and/or surround formation, stabilizers, downhole blowout preventers, circulation subs, mud pulse instruments, mud turbines, etc. In a common mode of operation, a pressurized drilling fluid is pumped down to the BHA 60 from the surface via the drill string 22.

Figure 2:
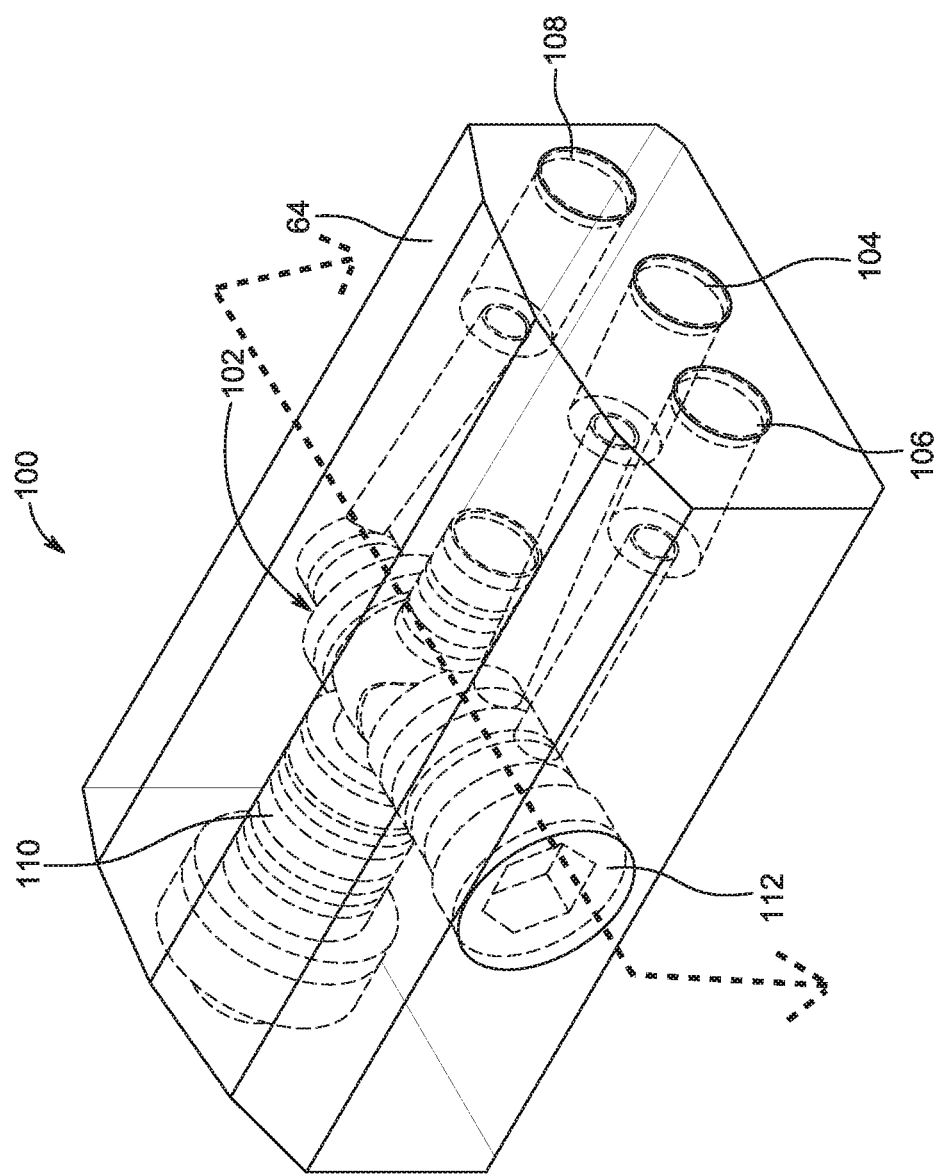
FIG. 2 shows an isometric view of one valve in accordance with the present disclosure.

Referring to FIG. 2, there is shown one non-limiting embodiment of a valve 100 that may be positioned in a section 64 of the drill string 22 to control fluid flow between two or more locations. These locations may be internal or external to the drill string 22. The valve 100 may include a valve body 102 that has two or more ports or openings. In the illustrated embodiment, the ports are an inlet 104 and two outlets 106, 108. The valve body 102 may also include a guide member 110 for a ball shaft 111 (FIG. 4) that operatively connects to an actuator 150 (FIG. 4) and a closure member 112 that retains internal valve components with the body 102.

Figure 3A:
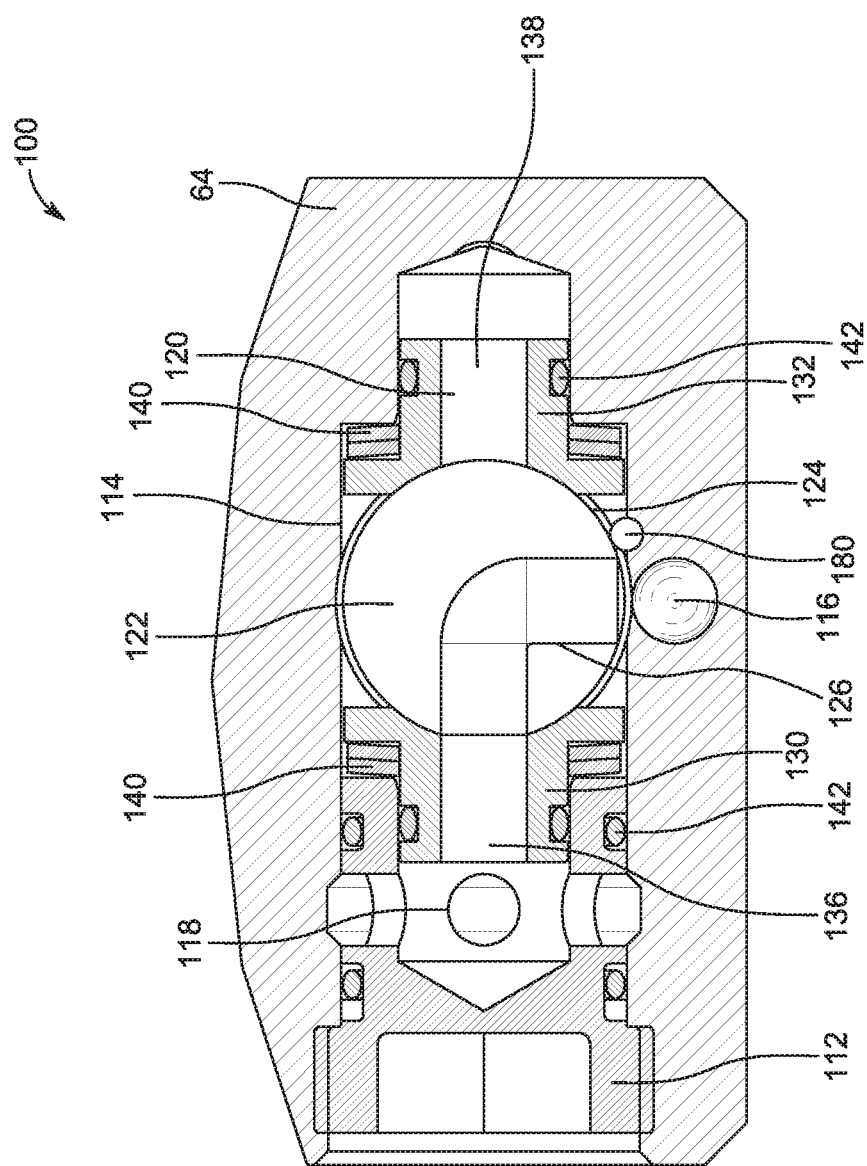
FIGS. 3A-C illustrate sectional views of the FIG. 2 valve in different operating states.

FIG. 3A is a cross-sectional view of the FIG. 2 valve and depicts these internal valve components. The valve body 102 has an internal chamber 114 in communication with the inlet 104 (FIG. 2) and the two outlets 106, 108 (FIG. 2). A flow passage 116 allows communication between the inlet 104 (FIG. 2) and the chamber 114, a flow passage 118 allows communication between the outlet 106 (FIG. 2) and the chamber 114, and a flow passage 120 allows communication between the outlet 108 and the chamber 114.

A ball 122 provides selective fluid communication between the flow passage 116 and the flow passages 118, 120. The ball 122 may be formed as a solid body having an outer surface 124 and one or more flow bores 126. The flow bore 126 enables selective fluid communication across the ball 122 while the outer surface 124 provides a sealing surface that prevents fluid communication across the ball 122. The ball 122 can spin or rotate within the internal chamber 114 in order to orient or position the flow bore 126 as desired.

The valve body 102 includes a first valve seat 130 and a second valve seat 132 to control fluid flow through flow passages 118, 120. The valve seats 130, 132 are positioned on opposing sides of the ball 122 and may be formed as tubular members that have seating surfaces that are complementary to the valve outer surface 124. The valve seat 130 has a bore 136 that forms a fluid connection between the flow bore 126 and the flow passage 118. The valve seat 132 has a bore 138 that forms a fluid connection between the flow bore 126 and the flow passage 120.

The closure member 112 secures the ball 122 and valve seats 130, 132 within the internal chamber 114. The closure member 112 may be cylindrically shaped and have threads (not shown) that enable the closure member 112 to be retained within the internal chamber 114. In embodiments, the closure member 112 may apply a compressive force to the ball 122 and the valve seats 130, 132 to enhance the sealing contact between these components. Additionally, biasing members 140 (e.g., springs) may be positioned in the internal chamber 114 to apply a bias to the valve seats 130, 132. Also, seals 142 may be used to form fluid barriers to ensure fluids flow only as intended through the valve 100.

Figure 3B:
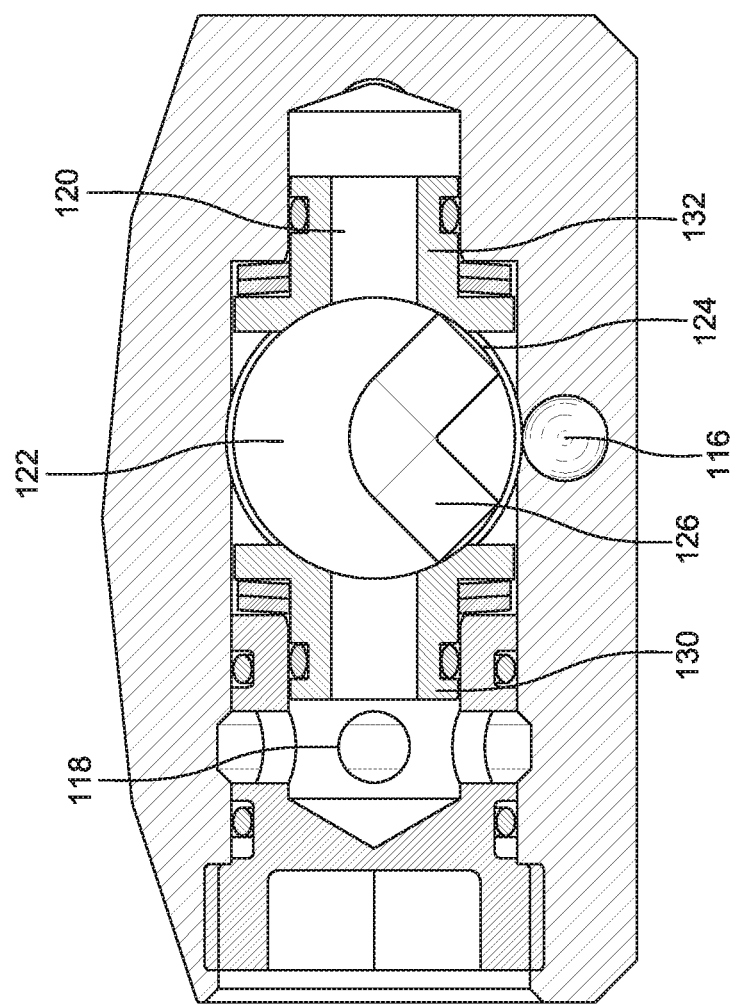
Figure 3C:
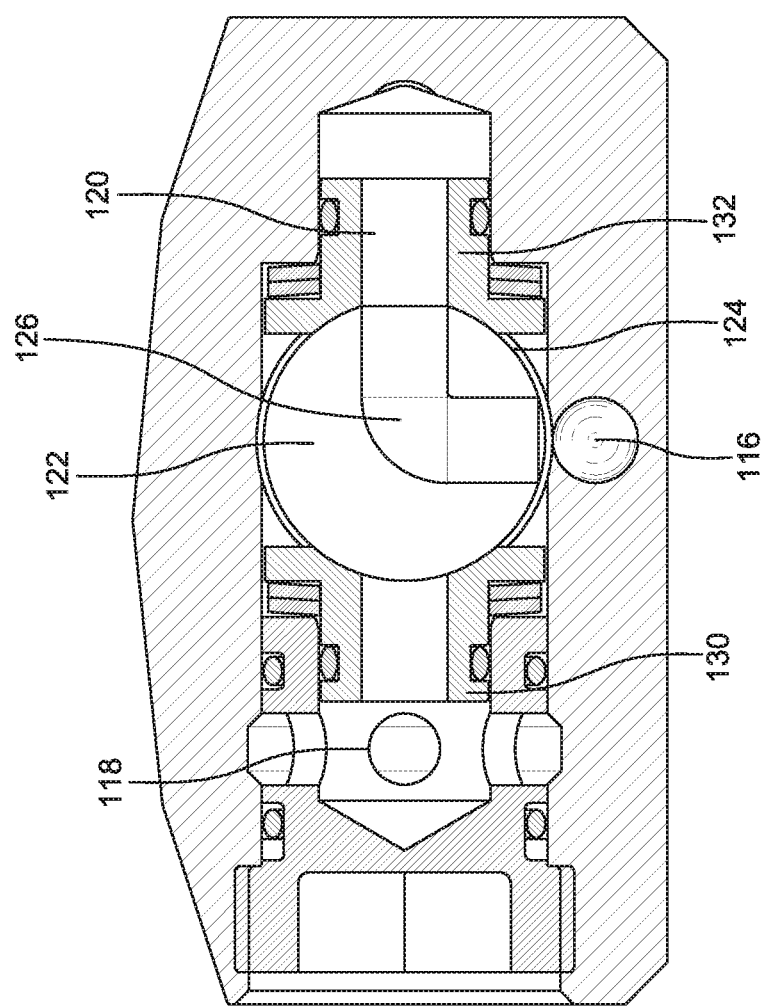
Figure 4:
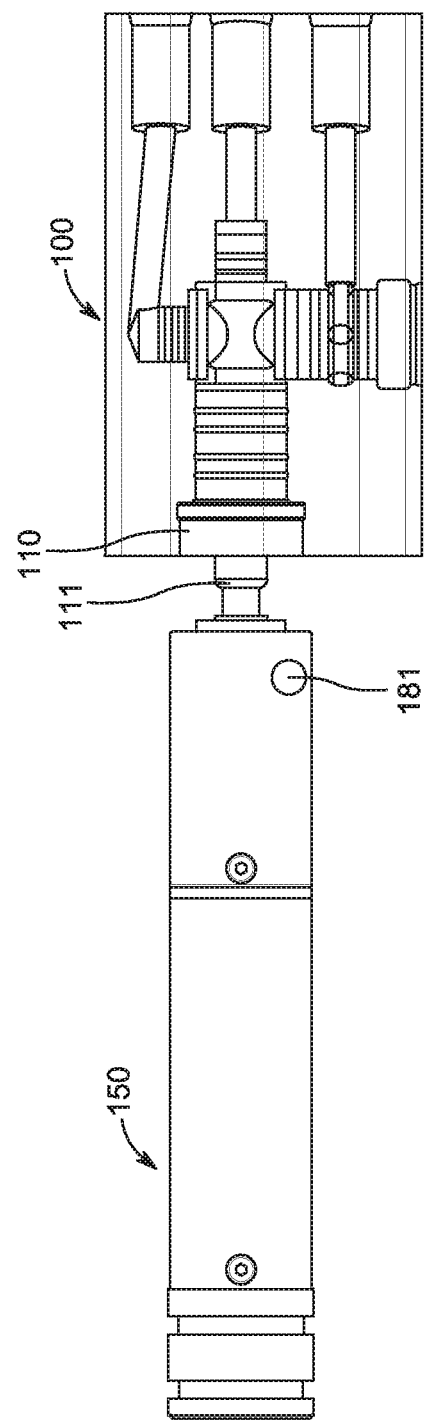
FIG. 4 illustrates an actuator that may be used with the FIG. 2 valve.

FIGS. 3A-C show the valve 100 in three different flow configurations. These different flow configurations are obtained by rotating the ball 122 in the chamber 114 using an actuator 150 as shown in FIG. 4. The actuator 150 may be mechanical, electro-mechanical, hydraulic and/or pneumatic and connect to the ball 122 via the ball shaft 111. In embodiments, the actuator 150 may be in signal communication with a communication system (not shown) that can receive control signals from a controller 68 (FIG. 1) at the surface or another downhole location. The actuator 150 may shift the valve 100 in response to the received control signal(s). The communication system (not shown) may use mud pulses, electrical signals conveyed via wiring or fiber optical signals, EM waves, or any other suitable signal carrying media. In embodiments, the actuator 150 may include microprocessors, memory, and programmed instructions to operate in autonomous, semi-autonomous, or purely signal-responsive modes.

In some embodiments, the valve 100 may include one or more sensors 180 (FIG. 3A) that estimate an orientation or position of the ball 122 or other component. The sensor 180 may also estimate parameters such as flow rate, fluid composition, pressure, temperature, etc. The information provided by the sensor(s) may be used to control the actuator 150, which then shifts the ball 122 as needed. This information may be sent to the surface controller 28 (FIG. 1). Alternatively or additionally, one or more sensors 181 (FIG. 4) at the actuator 150 (FIG. 4) may be position sensors that provide an inferential estimate of a position of a valve component such as the ball 122. This information may also be sent to the surface controller (FIG. 1).

FIG. 3A shows the ball 122 oriented to allow the flow bore 126 to connect the flow passage 116 associated with the inlet 104 (FIG. 2) with the flow passage 118 associated with the outlet 106 (FIG. 2). The outer surface 124 of the ball 122 seals against the ball valve seat 132 to block fluid flow between the flow passage 116 associated with the inlet 104 (FIG. 2) and flow passage 120 associated with the outlet 108 (FIG. 2). Thus, the flow passage 116 is only in hydraulic communication with the flow passage 118 and is hydraulically isolated from the flow passage 120.

FIG. 3B shows the ball 122 oriented to misalign the flow bore 126 with the flow passages 116, 118, and 120. The outer surface 124 of the ball 122 seals against both ball valve seats 130, 132. Because none of the flow passages 116, 118, and 120 are in fluid communication, i.e., aligned, with one another, no fluid flow is allowed through the valve 100. That is, the flow passage 116 is hydraulically isolated from both flow passages 118, 120.

FIG. 3C shows the ball 122 oriented to allow the flow bore 126 to connect the flow passage 116 associated with the inlet 104 (FIG. 2) to the flow passage 120 associated with the outlet 108 (FIG. 2). The outer surface 124 of the ball 122 seals against the ball valve seat 130 to block fluid flow between the flow passage 116 associated with the inlet 106 (FIG. 2) and flow passage 118 associated with the outlet 106 (FIG. 2). Thus, the flow passage 116 is only in hydraulic communication with flow passage 120 and is hydraulically isolated from the flow passage 118.

3D-F illustrate the flow conditions associated with the various positions/orientations of the ball 122 as shown in FIGS. 3A-C. Referring to FIG. 3D, the ball 122 positioned as shown in FIG. 3A aligns the flow bore 126 to connect the flow passage 116 with flow passage 118. This alignment connects the inlet 104 with only the outlet 106 via path 151. Referring to FIG. 3E, the ball 122 positioned as shown in FIG. 3B is misaligned so that the outer surface 124 seals the flow passages 116, 118, 120 from one another. This misalignment isolates the inlet 104 from the outlets 106, 108. Referring to FIG. 3F, the ball 122 as positioned in FIG. 3C aligns the flow bore 126 to connect the flow passage 116 with flow passage 120. This alignment connects the inlet 104 with only the outlet 108 via path 153.

Referring now to FIGS. 1-4, in one mode of use, the BHA 60 is conveyed into the wellbore 12 using the drill string 22. For surface controlled operations, personnel may transmit a control signal via a communication link using the controller 68 to a valve 100 positioned along the drill string 22. In response to the control signal, the valve 100 may initiate fluid flow, modify fluid flow, or terminate fluid flow between two or more locations. For instance, the control signal may cause the valve 100 to supply hydraulic fluid to a steering unit or pressurized slurry to a downhole packer. Advantageously, a later control signal may be send to cause the valve 100 to stop operation or modify operation. It should be appreciated that the valve 100 may be repeatedly cycled throughout the various modes of operation while in the wellbore 12. Another mode of use may involve autonomous operations wherein a downhole controller (not shown) controls the valve 100 in a closed loop operating mode. In variants, the controller 68 may receive signals from the valve 100. The signals maybe generated by sensors 180, 181 in the valve 100 and/or the actuator 150. In response to the received signals, the controller 68 may transmit one or more control signals to the actuator 150 to orient the ball 122.

It should be appreciated that valves according to the present disclosure may be susceptible to numerous variants. For example, while the ball 122 is shown as being rotated into multiple different orientations, some embodiments may use an actuator that uses linear movement to slide the ball 122 between two or more positions. That is, the ball 122 may be moved rotationally, linearly, or using compound motions. Moreover, while a single "L" shaped flow bore 126 is shown, the flow bore 126 may use any geometric shape (e.g., "V", "I", an arc, etc.). Additionally, while the flow bore 126 is shown as having two openings, other flow bores 126 may have multiple branches that require three or more openings. In still other embodiments, the ball 122 may have two or more flow bores 126. Still further, while the valve 100 is shown with three ports (i.e., one inlet and two outlets), other embodiments may employ different numbers of ports; e.g., one inlet and one outlet, two or more inlets and just one outlet, one inlet and three or more outlets, two or more inlets and two or more outlets, etc. It should be understood that variations increasing the number of outlets may require additional flow bores and/or valve seats.

Figure 5A:
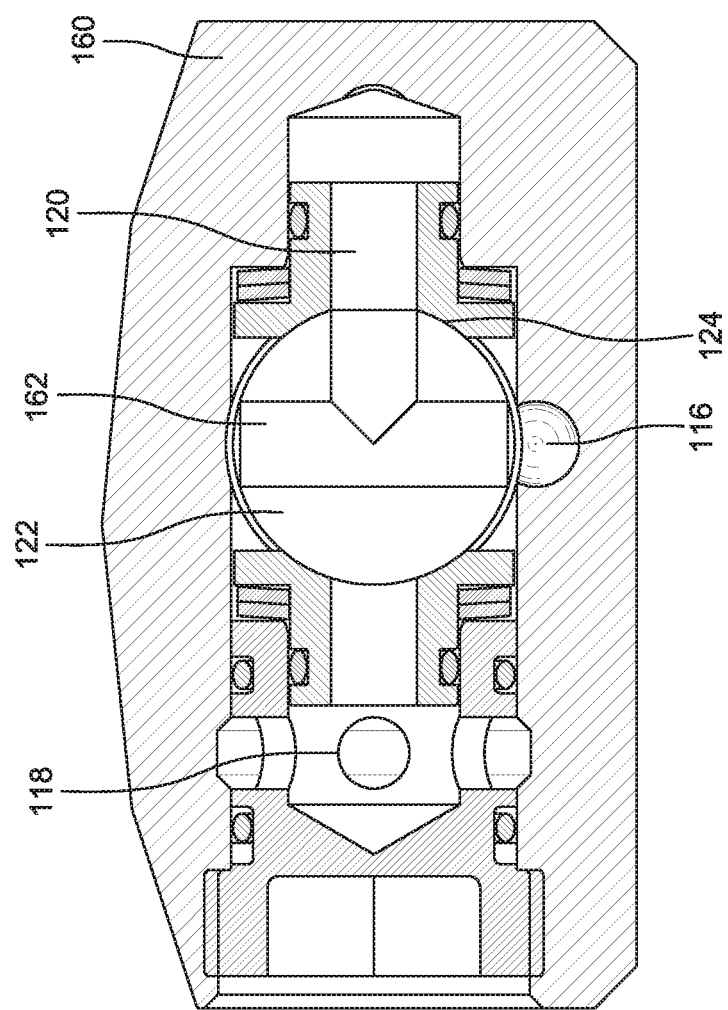

FIG. 5A is a cross-sectional view of another embodiment of a valve 160 in accordance with the present disclosure. As before, the valve 160 includes a ball 122 that provides selective fluid communication between the flow passage 116 and the flow passages 118, 120. The ball 122 may be formed as a solid body having an outer surface 124. In this embodiment, the ball 122 has a flow bore 162 formed as a "T" shape. That is, the flow bore 162 has an inlet branch that connects with a second branch that has two outlets. The flow bore 162 enables selective fluid communication across the ball 122 while the outer surface 124 provides a sealing surface that prevents fluid communication across the ball 122. The inlet branch has an opening at the ball outer surface 124 and the second branch has at least two openings formed on the ball outer surface 124.

Figure 5B:
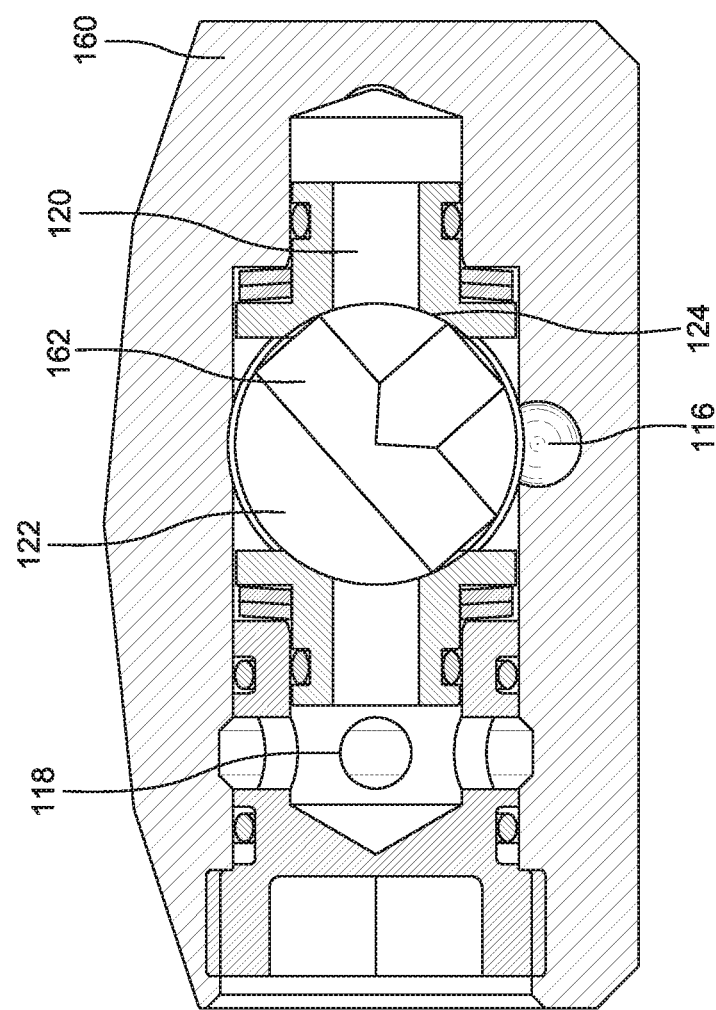
Figure 5C:
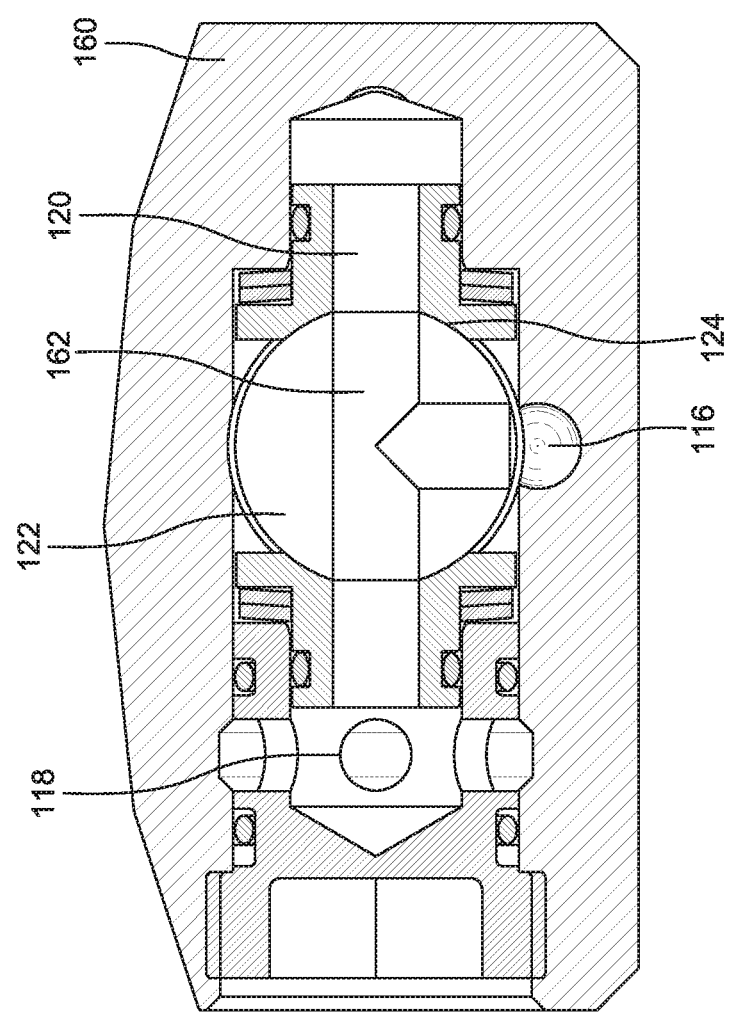
Figure 5D:
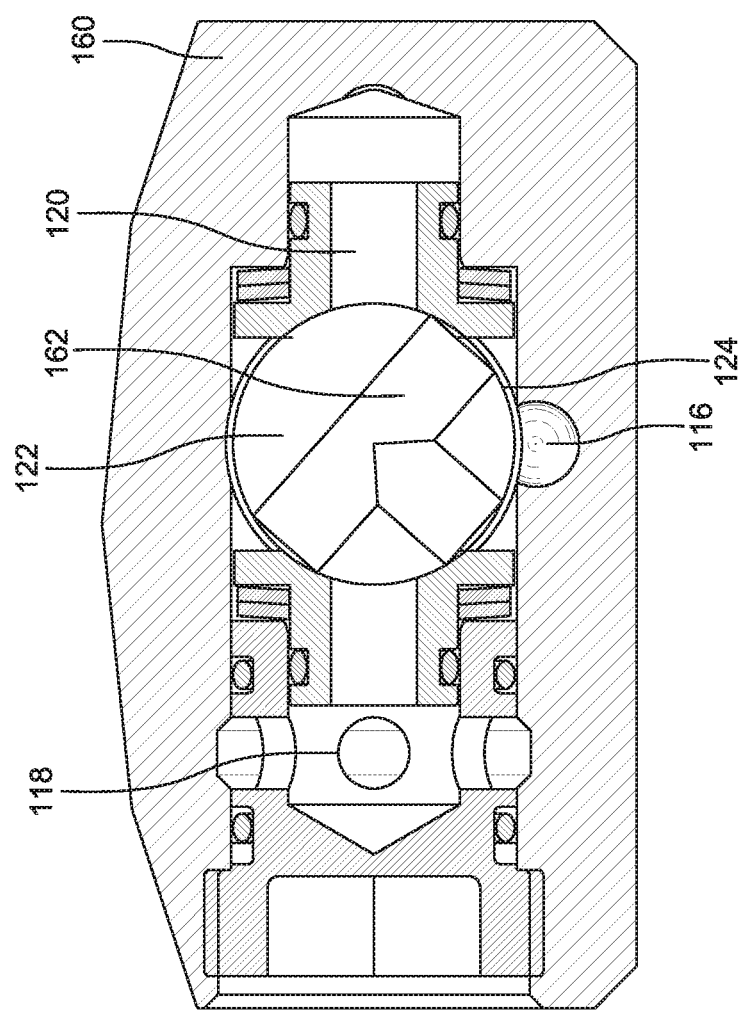
Figure 5E:
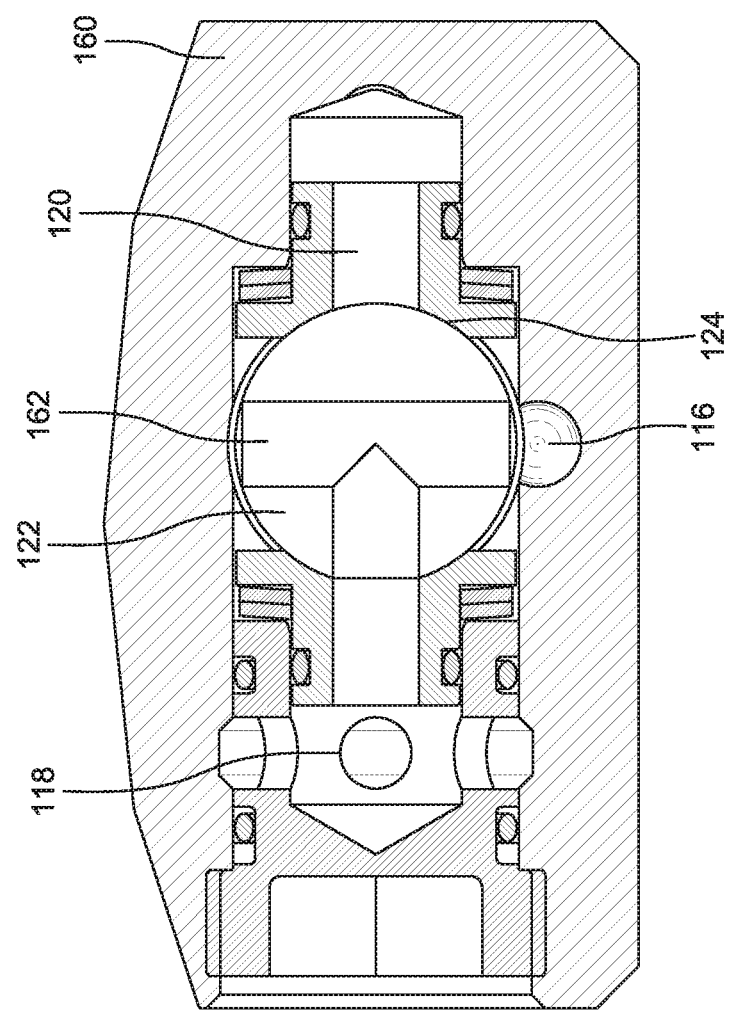

FIGS. 5A-E and 6A-E illustrate the operation of the valve 160. FIGS. 5A and 6A show the ball 122 aligned so that the flow bore 162 connects the flow passage 116 with flow passage 120. This alignment connects the inlet 104 with only the outlet 108 via path 170. FIGS. 5B and 6B show the ball 122 misaligned so that the outer surface 124 seals the flow passages 116, 118, 120 from one another. This misalignment isolates the inlet 104 from the outlets 106, 108. FIGS. 5C and 6C show the ball 122 aligned so that the flow bore 162 connects the flow passage 116 with both flow passages 118, 120. This alignment connects the inlet 104 with both outlets 106, 108 via path 172. FIGS. 5D and 6D show the ball 122 misaligned so that the outer surface 124 seals the flow passages 116, 118, 120 from one another. This misalignment isolates the inlet 104 from the outlets 106, 108. FIGS. 5E and 6E show the ball 122 aligned so that the flow bore 162 connects the flow passage 116 with flow passage 118. This alignment connects the inlet 104 with only the outlet 106 via path 174.

Thus, FIGS. 5A-E illustrate a non-limiting arrangement wherein a valve according to the present disclosure may use a ball to provide multiple flow arrangements. In addition to switching flow between two outlets, there are two positions wherein flow may be stopped, and one position wherein in flow may be split.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. An apparatus for controlling fluid flow in a wellbore, comprising:
   a drill string configured to drill the wellbore;
   a downhole tool positioned along the drill string; and
   a valve disposed in the downhole tool, the valve including:
      a valve body having an internal chamber,
      a plurality of ports formed in the valve body,
      a ball disposed in the internal chamber, the ball including at least one flow bore,
      at least one seal member disposed inside the internal chamber,
      at least one closure member enclosing the ball within the internal chamber,
   wherein the at least one closure member and the at least one seal form a fluid barrier within the valve body, the closure member having a first end, the first end being sealingly received by the valve body; and
      an actuator operatively connected to the ball, the actuator shifting the ball into at least a first position wherein the flow bore is in fluid communication with at least two of the plurality of ports, and a second position wherein the flow bore is isolated from at least one of the plurality of ports.

2. The apparatus of claim 1, wherein the valve includes at least a first and a second valve seat positioned on opposing sides of the ball, and at least one biasing member compressing the ball between the first and second valve seats.

3. The apparatus of claim 1, wherein the actuator is configured to rotate the ball into a plurality of different positions.

4. The apparatus of claim 1, wherein the actuator shifts the ball in response to a control signal received by the actuator.

5. The apparatus of claim 4, further comprising a controller at the surface configured to transmit the control signal.

6. The apparatus of claim 4, wherein the actuator includes at least one sensor generating signals representative of a position of the ball.

7. The apparatus of claim 6, further comprising a controller at the surface configured to transmit a control signal in response to the signals generated by the at least one sensor.

8. The apparatus of claim 1, wherein the flow bore has a first opening formed at a first end of the at least one flow bore, and a second opening formed at a second end of the flow bore, wherein the ball has a plurality of positions wherein the first opening and the second opening are each in fluid communication with one port of the plurality of ports.

9. The apparatus of claim 1, wherein the at least one flow bore is formed of a first branch and a second branch, wherein the first branch has an opening at an outer surface of the ball and connects with the second branch, and the second branch has at least two openings formed on the outer surface of the ball.

10. The apparatus of claim 1, further comprising: at least one sensor generating signals representative of a position of the ball; and a downhole controller configured to transmit a control signal in response to the signals generated by the at least one sensor.

11. The apparatus of claim 1, wherein the downhole tool is selected from one of: a downhole packer, a fluid sampling tool, a coring tool, a steering assembly, an adjustable centralizer, a drilling motor, and a thruster.

12. A method for use in controlling fluid flow in a wellbore, comprising:
  conveying a drill string along the wellbore, the drill string having at least one valve positioned thereon, the valve including:
    a valve body having an internal chamber,
    a plurality of ports formed in the valve body,
    a ball disposed in the internal chamber, the ball including at least one flow bore,
    at least one seal member disposed inside the internal chamber,
    at least one closure member enclosing the ball within the internal chamber,
    wherein the at least one closure member and the at least one seal form a fluid barrier within the valve body, the closure member having a first end, the first end being sealingly received by the valve body; and
    an actuator operatively connected to the ball, the actuator shifting the ball into at least a first position wherein the flow bore is in fluid communication with at least two of the plurality of ports, and a second position wherein the flow bore is isolated from at least one of the plurality of ports; and
  controlling the fluid flow by shifting the ball using the actuator.

13. The method of claim 12, further comprising receiving signals at a from at least one sensor associated with the actuator; and
  transmitting a control signal from the surface controller to the actuator to shift the ball in response to the received signals.

14. The method of claim 12, wherein the valve includes at least a first and a second valve seat positioned on opposing sides of the ball, and further comprising:
  compressing the ball between the first and second valve seats using at least one biasing member.

15. The method of claim 12, further comprising rotating the ball into a plurality of different positions using the actuator.

16. The method of claim 12, further comprising transmitting a signal from a surface controller to the actuator, the actuator shifting the ball in response to the control signal.

* * * * *